United States Patent
Friedrichs et al.

(10) Patent No.: US 6,353,053 B1
(45) Date of Patent: Mar. 5, 2002

(54) METHOD AND DEVICE FOR PRODUCING POLYURETHANES CONTAINING FILLING MATERIALS

(75) Inventors: Wolfgang Friedrichs, Köln; Uwe Künzel, Leverkusen; Kurt Krippl, Monheim; Klaus Schulte, Bergisch Gladbach, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/367,472

(22) PCT Filed: Feb. 4, 1998

(86) PCT No.: PCT/EP98/00582

§ 371 Date: Aug. 13, 1999

§ 102(e) Date: Aug. 13, 1999

(87) PCT Pub. No.: WO98/35803

PCT Pub. Date: Aug. 20, 1998

(30) Foreign Application Priority Data

Feb. 17, 1997 (DE) .......................... 197 06 030

(51) Int. Cl.[7] .............. C08J 3/00; C08K 3/20; C08K 3/04; C08L 75/00; B01F 13/06
(52) U.S. Cl. ................. 524/871; 366/139; 366/151.1; 366/151.2; 366/151.3; 366/156.1; 366/160.2; 366/165.4; 366/176.1; 366/181.8; 366/182.1; 422/133; 523/347; 523/348; 524/589; 524/590; 524/495; 524/496; 528/44; 528/48; 528/85
(58) Field of Search ................. 524/589, 590, 524/495, 496, 871; 528/44, 48, 85; 366/139, 151.1, 151.2, 151.3, 156.1, 160.2, 165.4, 176.1, 181.8, 182.1; 422/133; 523/347, 348

(56) References Cited

U.S. PATENT DOCUMENTS

| 3,574,644 A | | 4/1971 | Olstowski et al. ............. 106/15 |
| 4,242,306 A | | 12/1980 | Kreuer et al. ................ 422/133 |
| 5,023,280 A | | 6/1991 | Haas et al. .................. 521/106 |
| 5,152,943 A | | 10/1992 | Sulzbach .................... 264/40.7 |
| 5,360,885 A | * | 11/1994 | Orthmann et al. ............ 528/49 |
| 5,476,638 A | | 12/1995 | Sulzbach .................... 422/133 |
| 5,547,276 A | * | 8/1996 | Sulzbach et al. ........... 366/132 |
| 5,585,409 A | * | 12/1996 | Volkert et al. ................ 521/51 |

FOREIGN PATENT DOCUMENTS

| DE | 2428307 | 1/1976 |
| EP | 0 192 888 | 9/1986 |

OTHER PUBLICATIONS

Atkins, P.W., Physical Chemistry, Third Edition, 1986 pp. 658–659.*

* cited by examiner

*Primary Examiner*—Patrick D. Niland
(74) *Attorney, Agent, or Firm*—Joseph C. Gil; Noland J. Cheung; Carolyn M. Sloane

(57) ABSTRACT

The present invention is directed to a process and corresponding device for incorporating expanded graphite in a gentle manner into a polyurethane reactive mixture and, on the other hand, processes and corresponding means for reducing or preventing sedimentation of the expanded graphite in the liquid.

9 Claims, 5 Drawing Sheets

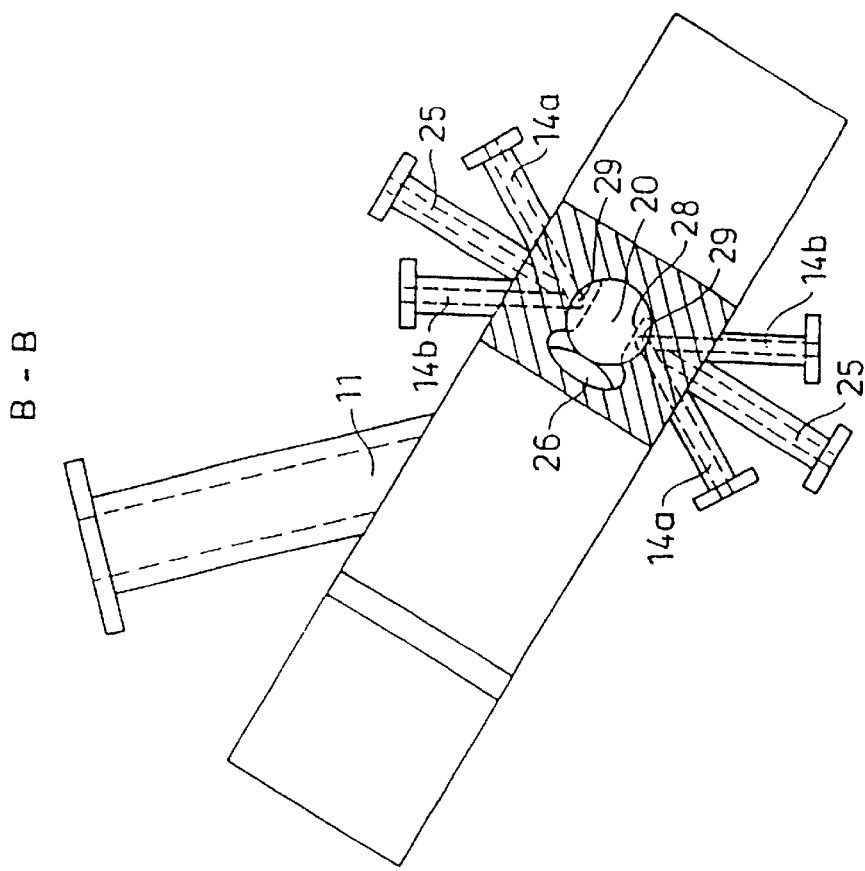
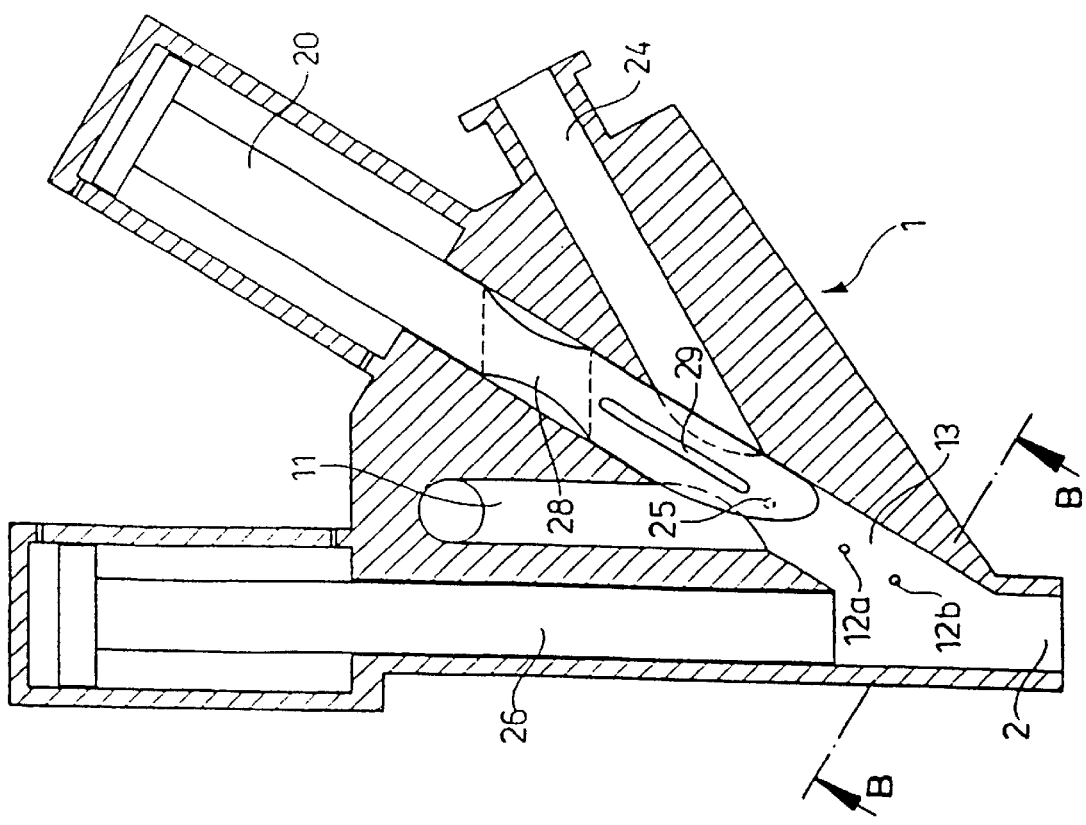

METHOD AND DEVICE FOR PRODUCING POLYURETHANES CONTAINING FILLING MATERIALS

BACKGROUND OF THE INVENTION

The production of polyurethanes containing filling material is generally carried out as follows: the components of the polyisocyanate polyaddition mixture and the filling materials are fed to the mixing head of a stirring apparatus, are there mixed and are then introduced into the open or closed mould or into the continuously moving mould formed by a double conveyor belt installation, the reactive mixture optionally being cured after closure of the mould and the moulded article subsequently being removed from the mould. In that operation, the filling material can be pre-mixed with the polyol component. It has also been proposed to pre-mix the liquid components of the polyisocyanate polyaddition reaction mixture in a counterflow injection mixing head and subsequently mix the filling materials with the reactive mixture in a friction mixer.

Depending on the properties of the solid to be used, a number of problems can occur with those processes. Coarse-grained filling materials having a particle size of, for example more than 0.55 mm or mechanically sensitive filling materials, such as, for example, encapsulated filling materials, can be destroyed mechanically in the above-described stirring units, such as stirring apparatus mixing heads or friction mixers, on account of the high shearing forces. Filling materials that have a tendency to form a sediment can become deposited in the supply pipes even in the case of short stoppages in production once they have been mixed with one of the reaction components. Moreover, they tend to form a sediment in the reacting polyisocyanate polyaddition mixture and to collect in the lower portion of the mould.

There are, for example, a number of proposals for using expandable graphite for flameproofing polyurethanes, especially polyurethane foam; see, for example, U.S. Pat. No. 3,574,644, DE-A 24 28 307, EP-A 192 888 and EP-A 337 228.

There are suitable as expanded graphite, for example, known inclusion compounds of $SO_x$, $NO_x$, halogen and/or strong acids in graphite. They are also known as graphite salts. Preference is given to expanded graphites which yield $SO_2$, $SO_3$, $NO$ and/or $NO_2$ at temperatures of, for example, from 120 to 350° C., with expansion. The expanded graphite may be, for example, in the form of lamellae having a maximum diameter in the range of from 0.1 to 5 mm. The diameter is preferably in the range of from 0.5 to 3 mm. Expanded graphites of that type are commercially available.

Based on the ready-to-use; flame-resistant insulating element, from 1 to 50 wt. %, for example, of expanded graphite may be contained therein. The content of expanded graphite is preferably from 2 to 30 wt. %, especially from 2 to 20 wt. %. The effect of the expanded graphite as a flame-protecting agent is tied to the size of the graphite particles. Expanded graphite particles which have been ground during the process of incorporation into a binder make only a very limited contribution to the flameproofing. Conventional processes for incorporating filling materials into polyurethane reactive mixtures lead to a considerable reduction in the particle size, which is detrimental to the flameproofing. Especially in the production of polyurethane foam containing expanded graphite, a high degree of sedimentation of the expanded graphite through the as yet uncured foam is also observed. Accordingly, insulating boards of high-resistance polyurethane foam which have been flame-protected by means of expanded graphite exhibit increased contents of expanded graphite on the underside (based on their position in the double conveyor belt installation), while the upper side is deficient in expanded graphite.

SUMMARY OF THE INVENTION

None of the mentioned publications dealing with the flameproofing of polyurethane foam gives an indication of how the expanded graphite is to be incorporated into the foam. Accordingly, expanded graphite has hitherto been unable to gain acceptance as a flame-protecting agent in polyurethane insulating boards.

The present invention provides, on the one hand, a process and corresponding devices for incorporating expanded graphite in a gentle manner into a polyurethane reactive mixture and, on the other hand, processes and corresponding means for reducing or preventing sedimentation of the expanded graphite in the liquid foam.

The invention is not, however, limited to the incorporation of expanded graphite into polyurethane, but can be used generally for incorporating mechanically sensitive filling materials into polyurethanes. Such filling materials are, for example, short glass fibres, which generally break during incorporation and hence lose some of their reinforcing potential.

Another example is the incorporation of iron oxide pigments in the production of insulating materials for screening electromagnetic radiation.

The present invention provides, on the one hand, a mixing head for mixing a polyol component containing filling material with an isocyanate component in order to produce a polyisocyanate polyaddition reaction mixture, containing a mixing chamber having an inlet opening for the polyol component containing filling material and having one or more inlet openings for the isocyanate component, the cross-sectional area of the inlet opening for the polyol component being from 10 to 100 times, preferably from 30 to 100 times, especially at least 50 times, greater than the sum of the cross-sectional areas of the inlet openings for the isocyanate component. According to the invention, the mixing chamber contains no movable or fixed turbulence-producing components.

The pipe supplying the polyol component containing filling material to the mixing chamber, the mixing chamber itself and the subsequent pipe to the mixture outlet preferably have substantially the same diameter, the mixing chamber simply being a region which is not sharply defined in respect of its extent in the-direction of flow, into which one or more inlet openings for the isocyanate component open.

From two to four inlet openings for the isocyanate component are preferably provided. The inlet openings for the isocyanate component can be arranged in a plane transverse to the direction of flow through the mixing chamber. Where a plurality of inlet openings for the isocyanate component are provided, however, they are preferably arranged in several successive planes.

The pressure of the polyol component containing filling material on introduction into the mixing chamber is preferably from 0.2 to 2 bar, especially from 1 to 1.5 bar. The isocyanate component can advantageously be injected into the mixing chamber at a pressure of from 50 to 250 bar, preferably over 100 bar.

The speed of the incoming polyol component is to be at least 1 m/s, preferably from 2 to 5 m/s. The speed of flow of the isocyanate component is preferably from 80 to 150 m/s.

The present invention also provides a process for mixing a polyol component containing filling material with an isocyanate component, which process is characterised in that the isocyanate component is injected into the polyol component containing filling material, the polyol component being at a pressure of from 0.2 to 2 bar and the pressure of the isocyanate component prior to injection being at least 50 bar, preferably from 100 to 250 bar. The isocyanate component is preferably injected into the polyol component at an angle of at least 90° to the direction of flow of the polyol component.

The polyol component containing filling material is preferably produced as follows:

The filling material is metered in via metering screws, proportioning belt weighers or shaking conveyors and is fed to a mixing screw for mixing with the polyol.

The gradient, the pitch of the wall, the length and the speed of rotation are preferably so matched to one another that the friction and the build up of pressure in the screw are minimised. A preferred embodiment of the mixing screw has a continuous conveyor screw (single blade screw) which leaves a gap relative to the screw housing which is larger than the particle size of the filling material. The width of the gap is preferably from 2 to 4 times the mean particle size. When an expanded graphite having a mean particle size of from 0.6 to 0.8 mm (diameter of the lamellae) is used, the gap between the screw and the housing is preferably from 1.5 to 2.5 mm. The gradient of the screw L/D (length of a turn divided by the diameter) may be from 0.8 to 1.5. The speed of rotation of the screw is preferably so chosen that the shear in the gap with respect to the screw housing does not exceed 30/s. In particular, the shear is to be from 10 to 25/s.

From the mixing screw, the polyol component containing filling material is fed to a supply hopper, which serves as the suction-side receiver for a metering pump for conveying the polyol component containing filling material to the mixing head. Suitable metering pumps are screw pumps or eccentric screw pumps which are operated in the low-pressure range to an internal pump pressure of 20 bar, i.e. in the speed range of from 300 to 500 rpm.

Between the metering pump and the mixing head there is preferably provided a gas-introduction device in which air and/or nitrogen are introduced in amounts of from 1 to 30 vol. % (normal conditions), based on polyol, into the polyol component containing filling material. Taking into account the amount of air already dissolved in the polyol as a result of storage, the amount of air present in the polyol after the introduction of gas is to be from 10 to 30 vol. %. The introduction of gas is preferably carried out in a flow-through container by means of a hollow stirrer, especially by means of a hollow-cone stirrer. At the prevailing pressure, the gas is dissolved completely. After the pressure of the polyisocyanate polyaddition reaction mixture downstream of the mixing head has been reduced to normal pressure, the mixture is supersaturated with the gas, so that gas bubbles are produced in the form of bubble seeds at the filling material particles and prevent the filling material from forming a sediment in the liquid polyurethane foam.

In the continuous production of polyurethane foam, the polyisocyanate polyaddition reaction mixture containing filling material is preferably fed onto the lower conveyor belt of a double conveyor belt installation by means of hollow-cone nozzles, fan, nozzles, spoon nozzles or slot dies. Special preference is given to fan nozzles which are obtainable from Lechler, Metzingen, Germany, under reference Z1 to Z4. By means of such nozzles it is possible to produce a broad flat stream with a sharply delimited spray pattern. The flat stream is preferably oriented parallel to the direction of movement of the conveyor belt, the mixing head with the delivery device being moved to and fro over the width of the conveyor belt.

By means of the present invention, mechanically sensitive filling materials, especially expandable graphite, can successfully be used in polyurethanes. In the course of the incorporation, the filling materials are not exposed to pressures greater than 20 bar. The pressures exerted preferably do not exceed 10 bar.

BRIEF DESCRIPTION OF THE DRAWINGS

FIGS. 4a, 4b and 4c show an alternative embodiment of a mixing head according to the invention for batchwise operation.

DETAILED DESCRIPTION OF THE INVENTION

Figure 1A:
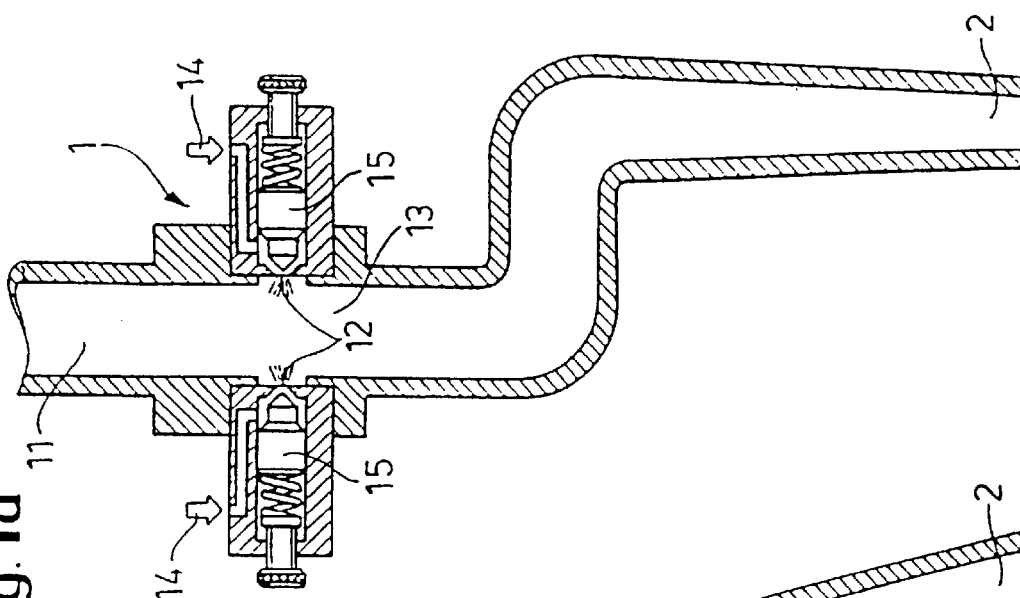
FIGS. 1a and 1b show a mixing head according to the invention having an outlet in the form of a slot die.
Figure 1B:
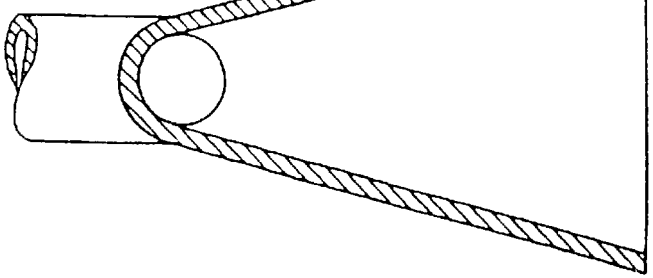

The mixing head 1 according to the invention of FIG. 1a contains a supply pipe 111 for the polyol containing filling material, and inlet openings 12 for the isocyanate. The inlet openings 12 have sealing cones 15 which are movable against prestressed springs and which open when isocyanate is supplied (arrow 14) at the required pressure. The mixing zone 13, which is not sharply defined in terms of geometry, is in the form of a simple flow-through pipe into which the injection nozzles 12 for the isocyanate open. The mixing zone 13 contains no turbulence-producing components of any kind. The injection nozzles 12 for the isocyanate are preferably not oriented in the direction of the axis of the mixing zone 13 but rotated in the plane perpendicular to the axis in such a manner that, as a result of the injection of the isocyanate, the stream of polyol containing filling material undergoes a rotary movement in the mixing zone 13 in order to assist with mixing. The outlet 2 of the mixing head 1 is in the form of a slot die. FIG. 1b shows a section perpendicular to the drawing plane of FIG. 1a through the mixing head outlet 2.

Figure 2:
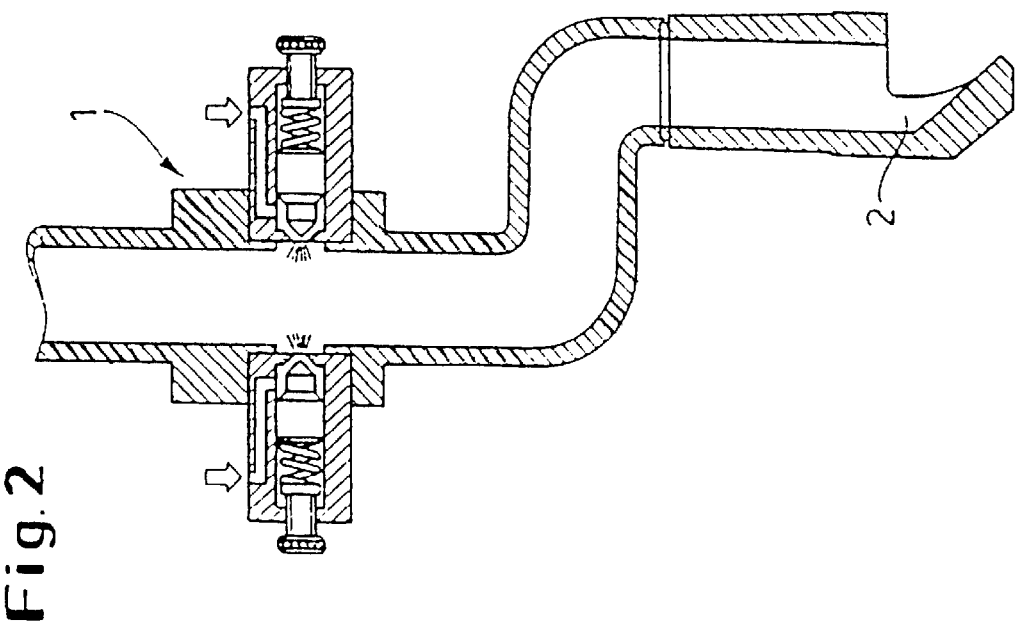
FIG. 2 shows a mixing head according to the invention having an outlet in the form of a spoon or fan nozzle.

FIG. 2 shows a mixing head 1 as in FIG. 1a, but the outlet 2 is in the form of a fan nozzle.

Figure 3A:
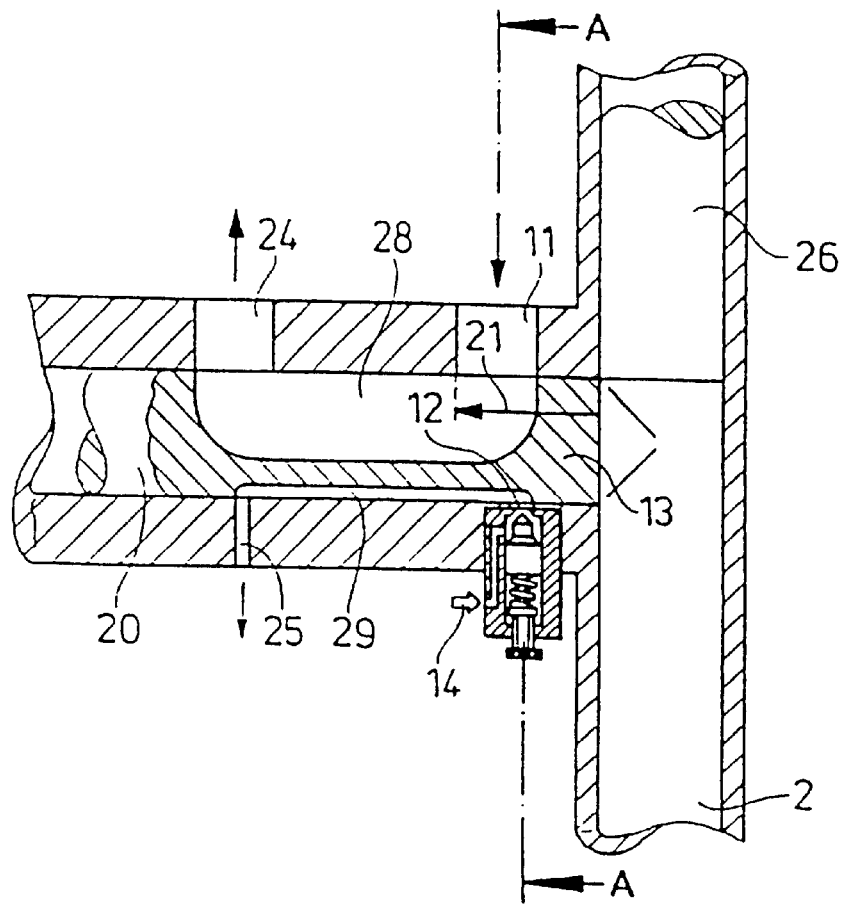
FIGS. 3a and 3b show a mixing head according to the invention for batchwise operation.
Figure 3B:
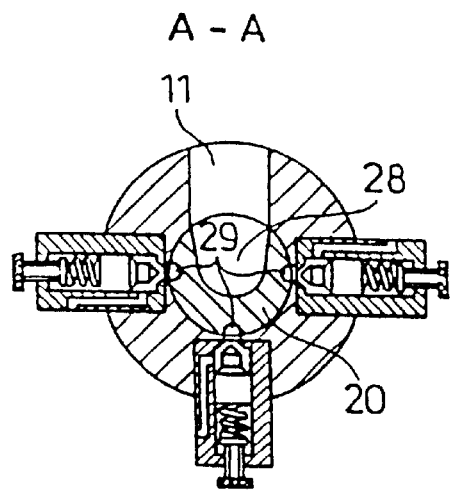

The mixing head 1 according to FIG. 3a is suitable for intermittent batchwise operation for the production of foam mouldings. The mixing head has a sealing piston 20, which is movable hydraulically in the axial direction (arrow 21). In order to fill the mould, the sealing piston 20 is moved back (as indicated by arrow 21) so that the inlet 11 for the polyol containing filling material and the injection nozzle 12 for the isocyanate are freed for entry into the mixing zone 13. From the mixing zone 13, the mixture passes into the outlet pipe 2, through which the mixture is introduced into the mould. When filling of the mould is complete, the sealing piston 20 is returned to the position shown, the inlets 11 and 12 to the mixing zone 13 being blocked. At the same time, the inlets 11 and 12 are connected via grooves 28 and 29 in the sealing piston 20 with the recirculation pipes 24 and 25, via which the polyol containing filling material and the isocyanate are fed back to their respective storage containers. The recirculating stream is maintained during breaks between batches, as is customary in polyurethane production technology. The mixing head also has a hydraulically operated cleaning piston 26 which, at the end of a batch, once the sealing piston 20 has moved into the sealing position, ejects the mixture remaining in the outlet pipe 2 from the outlet pipe 2. FIG. 3b shows a section A—A through the illustration of FIG. 3a. In the drawing shown by way of example, three injection nozzles are provided for introducing the isocyanate. Variations in the construction of the mixing head are possible and can readily be deduced by the person skilled in the art from Becker/Braun, Kunststoff-Handbuch, Volume 7, Polyurethane, p. 177–182 (1993). Essential to the invention is the large cross-section of the supply pipe for the polyol containing filling material as compared with the isocyanate inlet openings, with correspondingly large cross-sections for the recirculation pipes, so that the polyol containing filling material can be conveyed in a substantially pressure-free manner.

Figure 4C:
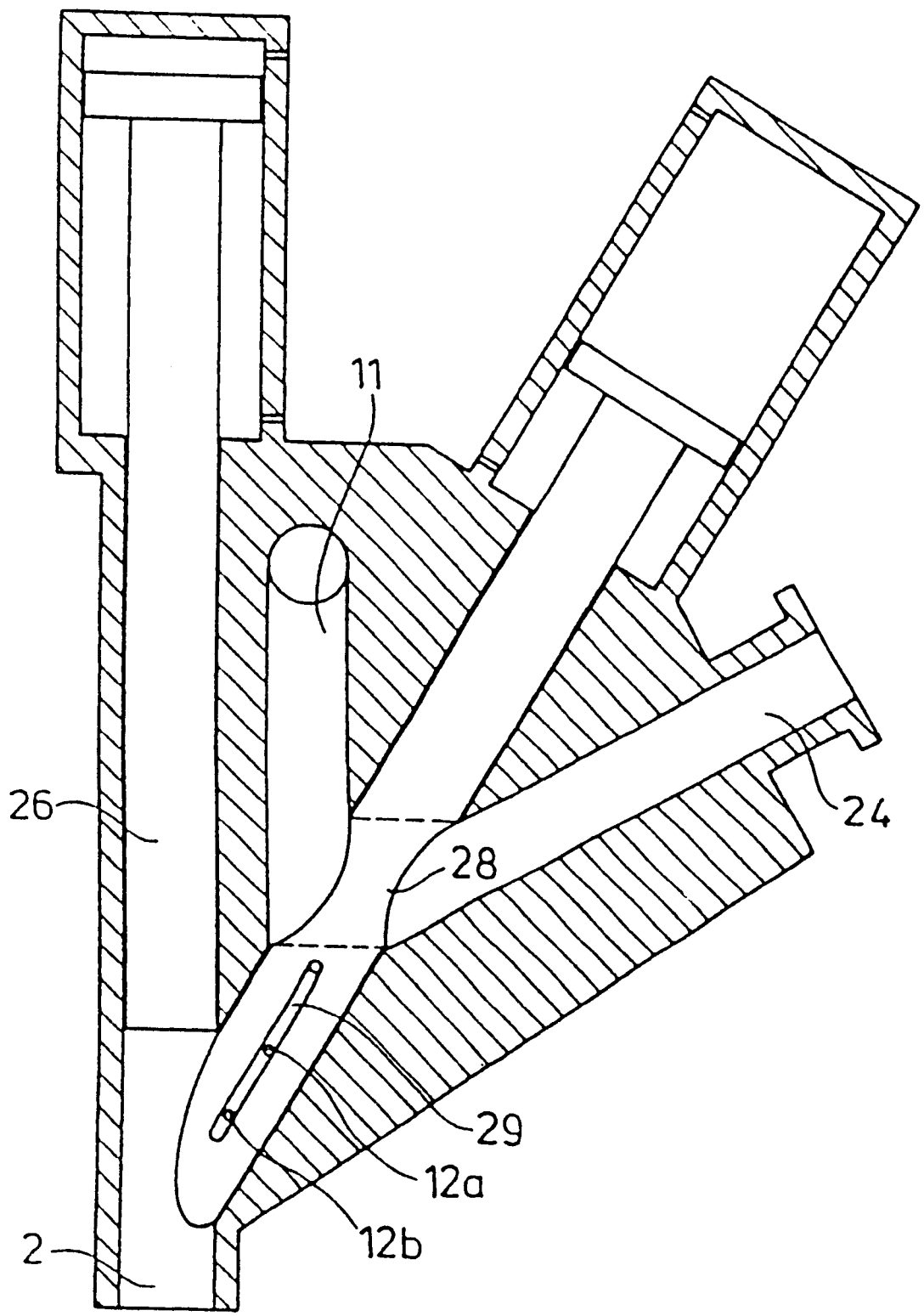

FIG. 4a shows an alternative embodiment of the mixing head according to the invention for intermittent batchwise operation, in which the angle through which the polyol containing filling material is turned can be kept small. The same reference numerals indicate the same elements as in FIG. 3a FIG. 4b shows a section B—B through the representation of FIG. 4a. FIG. 4c shows a representation according to FIG. 4a, in which the sealing piston 20 has been moved into the sealing position. On introduction into the mixing zone 13, the stream of polyol containing filling material supplied via pipe 11 is turned through only from 20 to 35°. The introduction of the isocyanate (four inlet openings 12a and 12b arranged in pairs opposite one another) is effected perpendicular to the stream of polyol. The isocyanate supply pipes 14a and 14b are offset in pairs in such a manner that the stream of polyol in the introduction planes is made to rotate in the opposite direction. Recirculation of the isocyanate at the end of a batch is effected via grooves 29 in the sealing piston 20. Recirculation of the polyol containing filling material is effected by means of a bore 28 through the sealing piston 20, which bore produces the connection to the recirculation pipe 24 in the sealing position.

Figure 5:
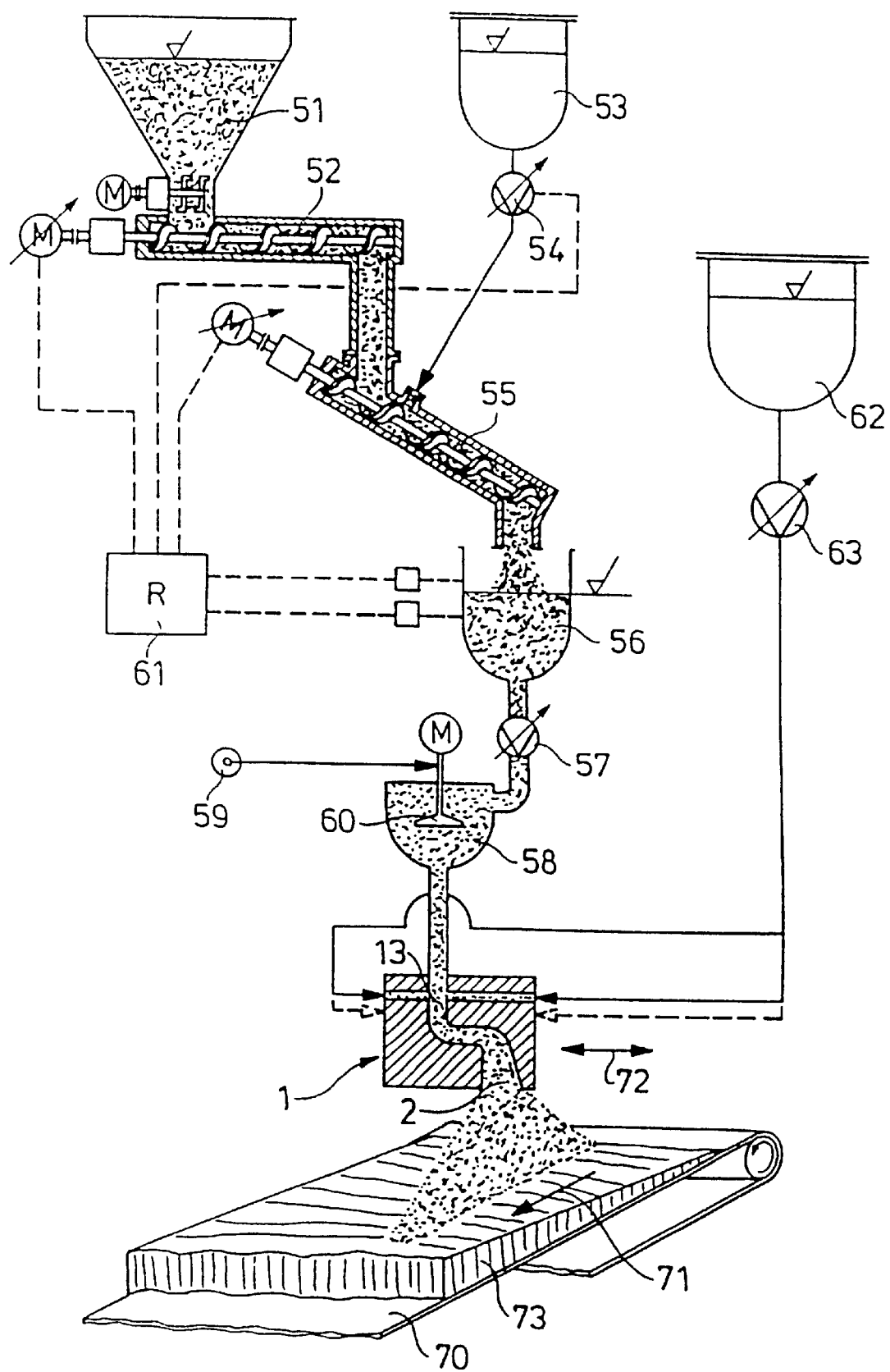
FIG. 5 shows diagrammatically a device according to the invention for producing insulating boards of polyurethane containing filling material.

FIG. 5 shows diagrammatically the process for incorporating filling materials into polyurethanes in a gentle manner. The filling material, especially expandable graphite, is conveyed from a supply hopper 51 by means of a metering screw 52 into the mixing screw 55. The polyol is conveyed from the storage container 53 via a metering pump 54 likewise into the mixing screw 55. From the mixing screw 55, the polyol containing filling material passes into the storage hopper 56, the supply volume of polyol containing filling material being so measured via the level control means 61 that the dwell time does not exceed from 8 to 20 seconds. As a result of the short dwell time in the storage hopper 56, sedimentation of the filling material in the storage hopper is avoided. By means of a screw pump 57 which is operated in the low-speed range, the polyol containing filling material is conveyed into the gas introduction device 58, which is in the form of a flow-through container. The introduction of gas is carried out by means of a hollow-cone stirrer 60, to which air or nitrogen 59 is supplied via its hollow shaft. From the gas-introduction container 58, the gas-laden polyol component containing filling material passes into the mixing head 1. In the mixing zone 13, isocyanate is injected under pressure from the storage container 62 via the metering pump 63. At the outlet of the mixing head 2, a broad stream of a polyisocyanate polyaddition mixture containing filling material is produced and is fed onto the conveyor belt 70 of a block foam installation, the conveyor belt 70 moving in the direction indicated by arrow 71. In order to distribute the mixture laterally over the width of the conveyor belt, the mixing head 1 is moved to and fro, as indicated by arrow 72. On leaving the mixing head 1, the gas dissolved in the mixture is released in the form of small bubbles at the filling material particles, so that the filling material particles do not form a sediment in the liquid foam 73 that is formed. In the case of intermittent operation of the mixing head (mixing head according to FIGS. 3 and 4) to produce mouldings, the isocyanate is returned to the storage container 62 during breaks between batches and the polyol containing filling material is returned to the supply hopper 56.

EXAMPLE

The A component is a mixture of 85 parts of a polyol formulation having a viscosity of approximately 2000 mPa.s (25° C.) and a hydroxy number of 590 mg of KOH/g, obtainable from Bayer AG, Leverkusen, under reference Baymer VP.PU 22HB96, 15 parts of tris(chloroisopropyl) phosphate (TCPP), 2 parts of a stabiliser, obtainable from Goldschmidt AG, Essen, under reference Tegostab B8421, 1.6 parts of activator, obtainable from Bayer AG, Leverkusen, under reference Demorapid 726b, and 2.0 parts of water. The A component is mixed in the mixing screw with 25 parts by weight of expanded graphite, obtainable from SGL Carbon under the trade name Sigraflex® FR. 10 parts by volume of air are introduced into the mixture in the gas-introduction container. In the mixing head, a mixture of 160 parts by weight of polyisocyanate, obtainable from Bayer AG under reference Desmodur 44V70L, and 8 parts by weight of n-pentane are injected (amounts are in each case per unit of time). An insulating board having a thickness of 10 cm and an apparent density of 34 g/m$^3$ is produced in a double conveyor belt installation. The expanded graphite is distributed uniformly over the thickness of the board. The fire behaviour test according to DIN 4102, Part 1, is complied with. The insulating board meets the requirements of building materials class B2.

What is claimed is:

1. Process for mixing a polyol component containing filling material with an isocyanate component in order to produce a polyisocyanate polyaddition reaction mixture, characterised in that the isocyanate is injected into the polyol component at a pressure of from 50 to 250 bar, the polyol component having a pressure of from 0.2 to 2 bar.

2. Process for the production of polyurethanes containing filling material, characterised in that the polyol component is pre-mixed with the filling material in a mixing screw having a full blade screw, the width of the gap between the screw and the screw housing being from 2 to 4 times the mean particle size of the filling material, the mixture is conveyed by means of a screw pump or an eccentric screw pump to a mixing head, the internal pump pressure not exceeding 20 bar and the pressure of the mixture on introduction into the mixing head not exceeding 2 bar, the isocyanate is injected at a pressure of from 50 to 250 bar into the polyol component containing filling material, and the polyisocyanate polyaddition mixture is introduced into a continuous or discontinuous mould and is cured.

3. Process according to claim 2, characterised in that expanded graphite is used as the filling material.

4. A process according to claim 2 characterized in that the polyol containing filling material is stored intermediately in an intermediate container for a dwell time of not more than 20 seconds.

5. A process according to claim 1 characterized in that from 1 to 30 vol. % of air and/or nitrogen, based on polyol, is introduced into the polyol component containing filling material.

6. Device for producing polyurethanes containing filling material, containing a metering device for the filling material, a metering device for the polyol, a mixing screw having a full blade screw for mixing the filling material and the polyol, the width of the gap between the screw and the screw housing being from 2 to 4 times the mean particle size of the filling material, a pressure-free intermediate storage container for the polyol component containing filling material, a screw pump or eccentric screw pump for conveying the mixture to a mixing head, and a mixing head for mixing the polyol component containing filling material with the isocyanate component, the mixing head having an inlet opening for the polyol component containing filling material whose cross-sectional area is from 10 to 100 times greater than the sum of the cross-sectional areas of the inlet openings for the isocyanate component.

7. A process according to claim 2, wherein expanded graphite is used as the filling material.

8. A process according to claim 3, wherein the polyol containing filling material is stored intermediately in an intermediate container for a dwell time of not more than 20 seconds.

9. A process according to claim 2, wherein from 1 to 30 vol. % of air and/or nitrogen based on polyol, is introduced into the polyol component containing filling material.

* * * * *